(12) United States Patent
Poluri et al.

(10) Patent No.: US 11,237,534 B2
(45) Date of Patent: Feb. 1, 2022

(54) MANAGING CERTIFICATES IN A BUILDING MANAGEMENT SYSTEM

(71) Applicant: Honeywell International Inc., Morris Plains, NJ (US)

(72) Inventors: Nagasree Poluri, Bangalore (IN); Manish Gupta, Bangalore (IN); Nagesh Narayanappa, Bangalore (IN); Ankith Makam, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 91 days.

(21) Appl. No.: 16/788,066

(22) Filed: Feb. 11, 2020

(65) Prior Publication Data
US 2021/0247731 A1 Aug. 12, 2021

(51) Int. Cl.
*G05B 19/042* (2006.01)
*H04W 4/20* (2018.01)

(52) U.S. Cl.
CPC .. *G05B 19/042* (2013.01); *G05B 2219/25011* (2013.01); *G05B 2219/2614* (2013.01); *H04W 4/20* (2013.01)

(58) Field of Classification Search
CPC ................................ G05B 19/042; H04W 4/20
USPC ........................................................ 700/276
See application file for complete search history.

(56) References Cited

U.S. PATENT DOCUMENTS

| 7,082,464 B2 | 7/2006 | Hasan et al. |
| 7,096,164 B1 | 8/2006 | Musharbash |
| 7,308,323 B2 | 12/2007 | Kruk et al. |
| 7,334,216 B2 | 2/2008 | Molina-Moreno et al. |
| 7,567,844 B2 | 7/2009 | Thomas et al. |
| 8,521,708 B2 | 8/2013 | Ahmed et al. |
| 8,830,267 B2 | 9/2014 | Brackney |
| 8,930,214 B2 | 1/2015 | Woolford |
| 9,294,468 B1 * | 3/2016 | Kilbourn ............... H04L 9/3263 |

(Continued)

FOREIGN PATENT DOCUMENTS

| CN | 110140096 A | 8/2019 |
| WO | 20170192752 A1 | 11/2017 |
| WO | 2019241772 A1 | 12/2019 |

OTHER PUBLICATIONS

Amazon Web Services, Inc., "AWS Certificate Manager FAQ's," 15 pages, 2016.
Amazon Web Services, Inc., "AWS Certificate Manager," Downloadable at https://aws.amazon.com/certificate-manager/, 6 pages, 2016.

(Continued)

*Primary Examiner* — Mohammad Ali
*Assistant Examiner* — Joshua T Sanders
(74) *Attorney, Agent, or Firm* — Seager, Tufte & Wickhem, LLP

(57) ABSTRACT

A method of providing a plurality of controller certificates for a plurality of controllers within a Building Management System (BMS) includes downloading project information defining the BMS and using the downloaded project information to solicit a Certificate Signing Request (CSR) from each of the plurality of controllers of the BMS. The received CSRs are uploaded to a remote server so that the remote server can generate a corresponding controller certificate for each of the plurality of controllers of the BMS. The generated controller certificates are then downloaded to the corresponding one of the plurality of controllers of the BMS.

14 Claims, 10 Drawing Sheets

(56) References Cited

U.S. PATENT DOCUMENTS

| | | | |
|---|---|---|---|
| 9,323,055 B2 | 4/2016 | Baillot | |
| 9,342,928 B2 | 5/2016 | Rasane et al. | |
| 9,571,986 B2 * | 2/2017 | Gottschalk | H04W 4/33 |
| 9,769,151 B2 | 9/2017 | Klieman et al. | |
| 10,278,048 B2 | 4/2019 | Sharma et al. | |
| 2003/0078798 A1 | 4/2003 | Zaks et al. | |
| 2003/0177205 A1 | 9/2003 | Liang et al. | |
| 2004/0250236 A1 | 12/2004 | O'Malley et al. | |
| 2006/0044307 A1 | 3/2006 | Song | |
| 2006/0055704 A1 | 3/2006 | Kruk et al. | |
| 2006/0058900 A1 | 3/2006 | Johanson et al. | |
| 2006/0058923 A1 | 3/2006 | Kruk et al. | |
| 2006/0112073 A1 | 5/2006 | Jensen et al. | |
| 2011/0115816 A1 | 5/2011 | Brackney | |
| 2013/0031202 A1 | 1/2013 | Mick et al. | |
| 2013/0069985 A1 | 3/2013 | Wong et al. | |
| 2013/0169681 A1 | 7/2013 | Rasane et al. | |
| 2013/0212453 A1 | 8/2013 | Gudai et al. | |
| 2013/0290706 A1 * | 10/2013 | Socky | H04L 63/0823 713/158 |
| 2014/0282257 A1 | 9/2014 | Nixon et al. | |
| 2015/0062164 A1 | 3/2015 | Kobayashi et al. | |
| 2015/0097706 A1 | 4/2015 | Perger et al. | |
| 2015/0120000 A1 | 4/2015 | Coffey et al. | |
| 2015/0222604 A1 * | 8/2015 | Ylonen | H04L 9/083 713/171 |
| 2015/0310664 A1 | 10/2015 | Boussard et al. | |
| 2015/0341390 A1 | 11/2015 | Kiefer et al. | |
| 2016/0019212 A1 | 1/2016 | Soldani | |
| 2016/0042568 A1 | 2/2016 | Farnham et al. | |
| 2016/0095188 A1 | 3/2016 | Verberkt et al. | |
| 2016/0313902 A1 | 10/2016 | Hill et al. | |
| 2017/0018120 A1 | 1/2017 | Li et al. | |
| 2017/0005344 A1 | 2/2017 | Nadumane et al. | |
| 2017/0053441 A1 | 2/2017 | Nadumane et al. | |
| 2017/0091607 A1 | 3/2017 | Emeis et al. | |
| 2017/0021339 A1 | 7/2017 | Ramachandran et al. | |
| 2017/0213390 A1 | 7/2017 | Ramachandran et al. | |
| 2018/0012173 A1 | 1/2018 | Leen et al. | |
| 2018/0129276 A1 | 5/2018 | Nguyen et al. | |
| 2018/0157321 A1 | 6/2018 | Liu | |
| 2018/0218538 A1 | 8/2018 | Short et al. | |
| 2018/0218540 A1 | 8/2018 | Sridharan et al. | |
| 2018/0262349 A1 | 9/2018 | Ranjan et al. | |
| 2019/0186779 A1 | 6/2019 | Janakiraman et al. | |
| 2019/0268472 A1 | 8/2019 | Amir et al. | |
| 2019/0355177 A1 | 11/2019 | Manickam et al. | |

OTHER PUBLICATIONS https://www.ibm.com/support/knowledgecenter/SSLTBW_2.1.0/com.ibm.zos.v2r1.icha700/toc.htm, "Summary of Steps for Defining a RACF Group," z/OS Security Adminstrator's Guide, 2 pages, 2014.

Schneider Electric, "User Assistance for StruxureWare Data Center Expert (DCE)7.2.2," 3 pages, 2014.

Sun Microsystems, Inc., "iPlanet Certificate Management System Installation and Setup Guide," Chapter 1, 30 pages, Oct. 7, 2002.

Tridium, "Open Integrated Solutions, Automation with the Niagara Framework," 16 pages, 2013.

U.S. Appl. No. 15/980,520, "Building System Maintenance Using mixed Reality", Filed May 15, 2018.

Lee, et al., "The Virtual-Augmented-Reality Environment for Building Commission: Case Study", Proceedings of the Fifth International Conferene for Enhanced Builidng Operations, Pittsburgh, Pennsylvania, Oct. 2005, 6 pages.

Akin, et al., "Linking Building Commissioning and Operations and Maintenance Towards an Embedded Commissioning Practice", Proceedings of the Fifth International Conference for Enhanced Building Operations, Pittsburgh, Pennsylvania, Oct. 11-13, 2005, 10 pages.

Lee, et al., "The Development of an Augmented Reality-Based Data Visualization System for Commissioning of Air Handling Units", 7th International Conference on Construction Applications of Virtual Reality, Oct. 2007, 10 pages.

Lee, et al., "The Development of an Augmented Reality-Based User Interface To Support Maintenance Fieldwork", Embodying Virtual Architecture: The Third International Conference of the Arab Society for Computer Aided Architectural Design (ASCAAD 2007), Nov. 2007, 8 pages.

Hakkarainen, et al., "Mobile Augmented Reality for Building and Construction", International AR Standards Workshop, Oct. 2010, 3 pages.

PCT/US2018/065970 Search Report and Written Opinion, pp. 13, Mar. 22, 2019.

Fiorentino, et al. "Augmented reality on large screen for interactive maintenance instructions", Computers in Industry, 2014, 18 pages.

Busker, "Task Specific Information Visualizations Using Head-Mounted Display Technology", http://essay.utwente.nl/69492/1/Busker,%20B.%200166944%20_%20openbaar.pdf, Apr. 2016, 31 pages. [Secured Download Only].

Gürsel, "Linking Building Commissioning and Operations and Maintenance Towards an Embedded Commissioning Practice", Proceedings of the Fifth International Conference for Enhanced Building Operations, Pittsburgh, Pennsylvania, Oct. 11-13, 2005, 10 pages.

European Extended Search Report, EP Application No. 21153879.8, dated Jun. 28, 2021 (10 pages).

\* cited by examiner

MANAGING CERTIFICATES IN A BUILDING MANAGEMENT SYSTEM

TECHNICAL FIELD

The present disclosure relates generally to a building management system. More particularly, the present disclosure relates to methods and systems for managing certificates for controllers and/or other client devices within a building management system.

BACKGROUND

Devices such as but not limited to controllers and other client devices within a building management system (BMS) often utilize security certificates to establish secure communication within the BMS. Controllers utilize controller certificates while other client devices such as computers and other Human Machine Interfaces (HMI) utilize client certificates. For security purposes, certificates often have an expiration date, and thus they need to be periodically renewed. Requesting, applying and/or renewing such certificates in a building management system can be a time consuming and tedious process. Thus, there is a need for an improved way of requesting, applying and/or renewing security certificates in a building management system.

SUMMARY

The present disclosure relates generally to methods and systems that provide an improved way of requesting, applying and/or renewing security certificates in a building management system. In one example, all of the certificates for a BMS may be batch-downloaded using a mobile device. In a particular example, a plurality of controller certificates for a plurality of controllers within a Building Management System (BMS) may be provided using an application executing on a mobile device, the mobile device in communication with a remote server having an Application Programming Interface (API). The mobile device may download project information defining the BMS from the remote server. The downloaded project information may include a project name and controller configuration information for each of the plurality of controllers including a controller name and/or a controller IP address. The mobile device may use the downloaded project information to solicit a Certificate Signing Request (CSR) from each of the plurality of controllers of the BMS by contacting an API of each of the plurality of controllers. The mobile device may receive the CSRs from each of the plurality of controllers and may upload each of the CSRs to the API of the remote server so that the remote server can generate a corresponding controller certificate for each of the plurality of controllers of the BMS. Each of the generated controller certificates may then be downloaded to the corresponding one of the plurality of controllers of the BMS.

In another example, a plurality of client certificates for a plurality of client devices within a Building Management System (BMS) may be provided using an application executing on a certificate management device. The certificate management device may include a user interface and may be in communication with a remote server. The client management device may receive client device information including a list of client devices and login information, and may transmit the received client device information to the remote server. The remote server may then generate client certificates for each of the client devices and downloads the client certificates to the client management device. The client management device may then download the client certificates to each of the client devices. In one example, the client devices may refer to controllers and/or other client devices within a building management system.

In yet another example, a non-transient, computer-readable storage medium may have stored thereon executable instructions that when executed by one or more processors of a certificate management device that is configured to communicate with a remote server, cause the certificate management device to download from the remote server project information defining the configuration of a plurality of devices of the BMS, to use the downloaded project information to solicit Certificate Signing Requests (CSR) from each of the plurality of devices by contacting each of the plurality of devices, and to upload each of the CSRs to the remote server so that the remote server can batch generate a device certificate for each of the plurality of devices of the BMS.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
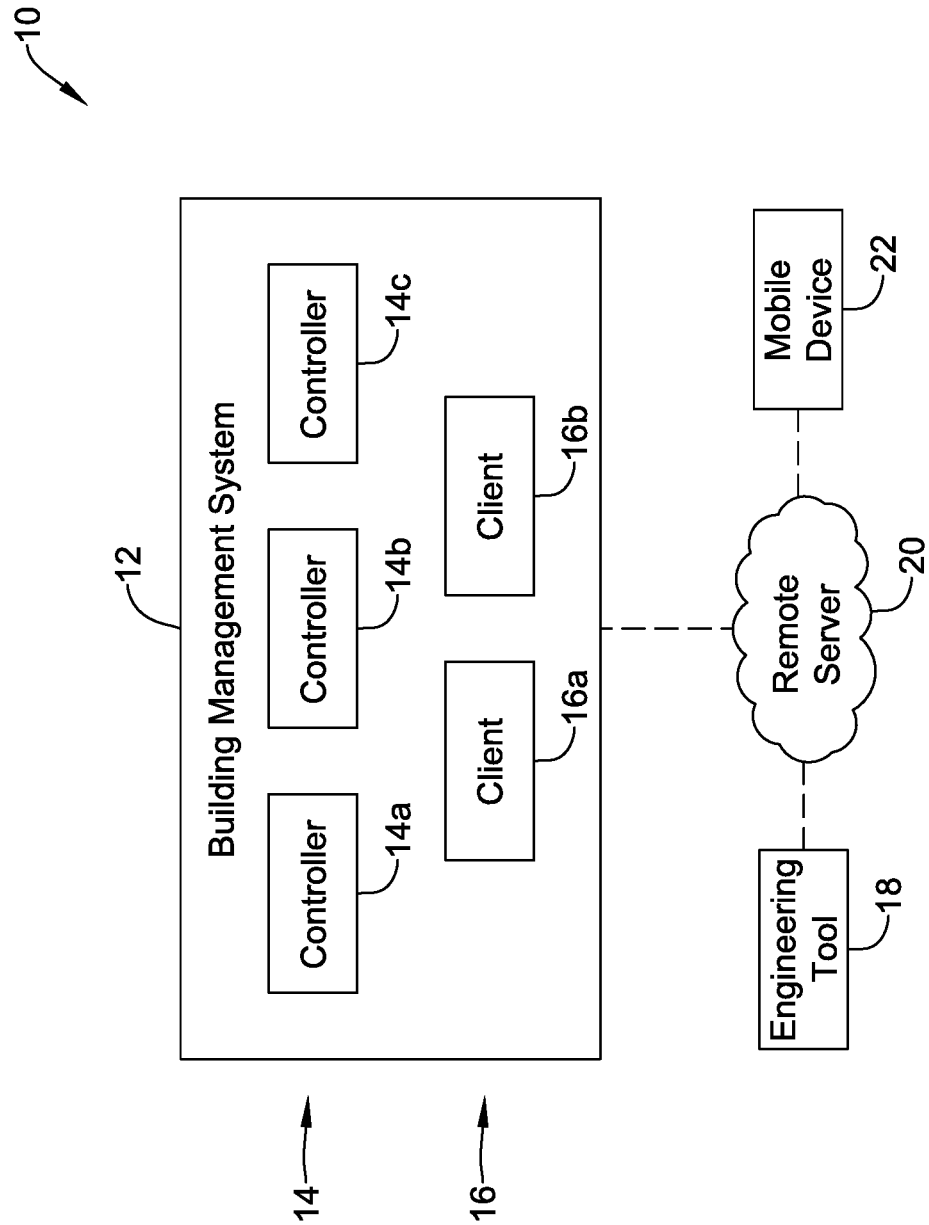
FIG. 1 is a schematic block diagram of a building management system and an illustrative system for generating certificates for the building management system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of a system 10 that includes a building management system (BMS) 12. The illustrative BMS 12 includes a number of controllers 14, individually labeled as a controller 14a, a controller 14b and a controller 14c. Each of the controllers 14 may include an Application Programming Interface (API). It will be appreciated that the BMS 12 may include any numbers of controllers 14. The controllers 14 may individually control any number of different components (not illustrated) within the BMS 12. The BMS 12 may include, for example, a security system, a heating, ventilating and/or cooling (HVAC) system, and/or any other suitable building management system. In some cases, each of the controllers 14 may individually control one or more system components, such as a furnace, an air conditioner, a security system, one or more sensors, one or more actuators and/or one or more switches. These are just examples. In some cases, one or more of the controller 14 may control operation of a portion or system component of an industrial process. In some cases, some or all of the controllers 14 may operate independently. In some cases, some or all of the controllers 14 may operate in a master-slave or other cooperative relationship. In some cases, at least some of the controllers 14 may be arranged in a hierarchal manner, with one or more controllers 14 reporting to or otherwise controlled by another of the controllers 14. These are just examples.

The illustrative BMS 12 also includes a number of other clients 16, individually labeled as a client 16a and a client 16b. It will be appreciated that the BMS 12 may include any number of clients 16. The clients 16 may represent computers such as laptop computers or desktop computers. At least some of the clients 16 may be and/or may include other human machine interfaces (HMI) devices. One or more of the clients 16 may be involved in reporting or processing data generated by various components and processes of the BMS 12. One or more of the clients 16 may, for example, be involved in providing instructions to one or more of the controllers 14. These are just examples, as it will be appreciated that there are a number of different ways in which the controllers 14 and the clients 16 may be interconnected within the BMS 12. It is contemplated that the phrase "client device" may refer to the controllers 14 and/or other client devices (e.g. clients 16) within a building management system.

The illustrative system 10 also includes an engineering tool 18 that may be used, for example, in configuring the BMS 12. It will be appreciated that configuring a modern BMS such as the illustrative BMS 12 often involves entering and/or otherwise manipulating a large amount of information pertaining to configuration and subsequent operation of each of the components of the BMS 12, including but not limited to the controllers 14 and the clients 16. The engineering tool 18 may be used by a technician to enter and/or otherwise manipulating such information. Additional details regarding an illustrative engineering tool 18 may be found, for example, in co-pending U.S. patent application Ser. No. 16/788,119, filed Feb. 11, 2020, and entitled "Using Augmented Reality to Assist in Device Installation", U.S. patent application Ser. No. 16/788,183, filed Feb. 11, 2020, and entitled "HVAC System Configuration with Automatic Parameter Generation", and U.S. patent application Ser. No. 16/788,206, filed Feb. 11, 2020, and entitled "HVAC System with Automatic Schematics and Graphics Generation". Each of these patent applications are incorporated by reference herein in their entireties.

In the example shown, the engineering tool 18 may be in communication with a remote server 20. The remote server 20 may be used to store at least some of the configuration data pertaining to the components (such as but not limited to the controllers 14 and the clients 16) of the BMS 12. The remote server 20 may include an API. While the remote server 20 is illustrated as a single server, and is illustrated as being a cloud-based server, this is not required in all cases. For example, the remote server 20 may be a single computer server, or a group of computer servers. The remote server 20 may be located remote from a building that houses the BMS 12, or the remote server 20 may be remote from the engineering tool 18 but may still be located within the aforementioned building that houses the BMS 12. In some cases, the remote server 20 and the engineering tool 18 may be co-located. A mobile device 22, which in some cases may be referred to as a certificate management device, may be in communication with the remote server 20. The mobile device 22 may be, for example, a mobile phone, a tablet, a laptop computer or any other suitable mobile device. As noted, the engineering tool 18 may be used in initially configuring the BMS 12, including identifying each of the components of the BMS 12. As will be discussed in greater detail, the mobile device 22 may be subsequently used in communicating with the remote server 20 as well as with the controllers 14 and the clients 16 in order to provide a user of the mobile device 22 with an intuitive, efficient and secure way to provide certificate management for the BMS 12.

Certificates are used by the controllers 14 and the clients 16 for providing secure communication between individual components of the BMS 12, such as communication between two or more different controllers 14, or between a controller 14 and a client 16, or between two or more different clients 16. By virtue of the configuration information entered into the engineering tool 18, and subsequently stored within, and retrievable from, the remote server 20, an application executing on the mobile device 22 may be used to solicit and obtain controller certificates for use by each of the controller 14 as well as client certificates for use by each of the clients 16. In some cases, the application may be stored within memory of the mobile device 22. In some instances, the application may be downloadable to the mobile device 22 from the remote server 20.

Figure 2:
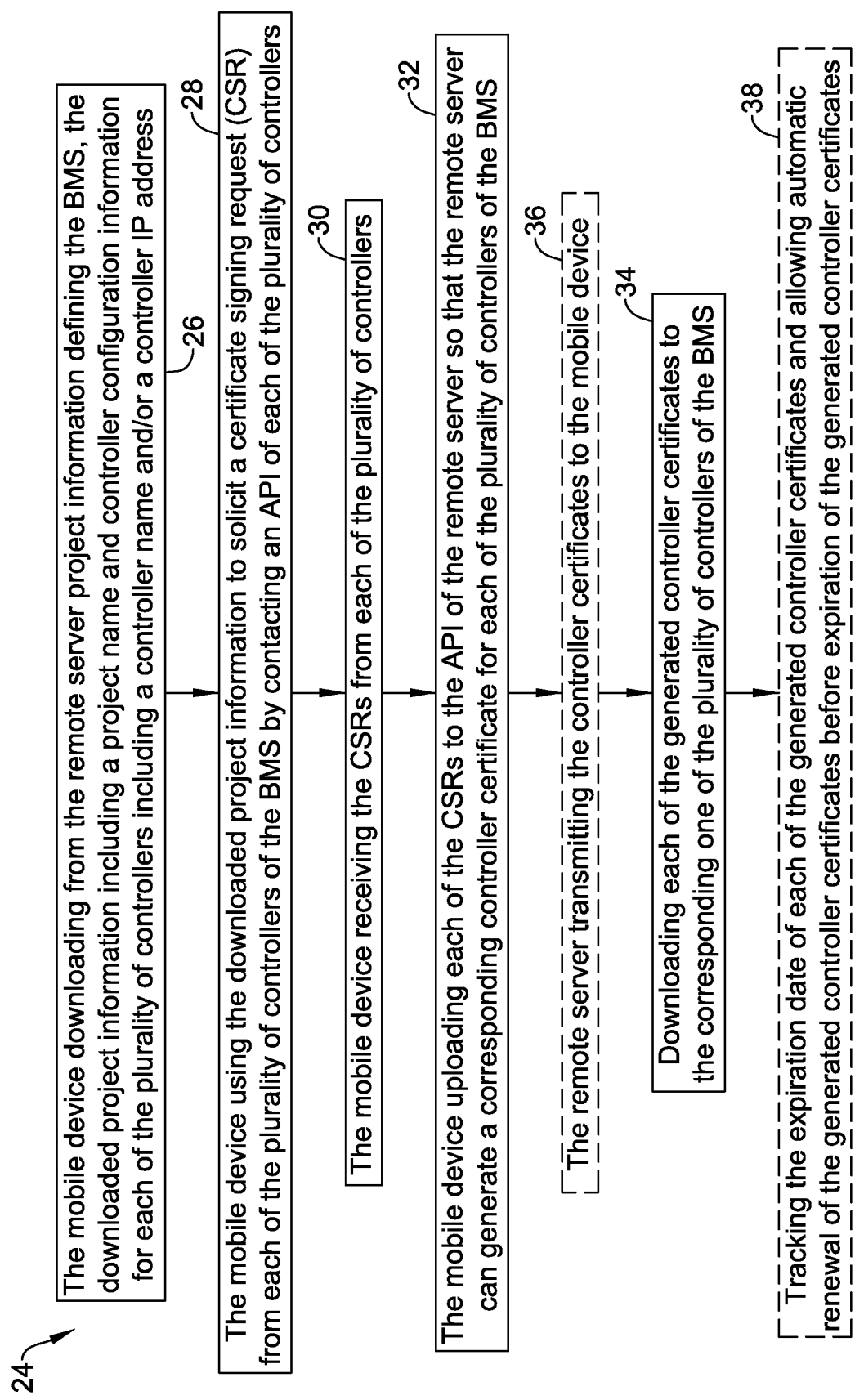
FIG. 2 is a flow diagram showing an illustrative method of providing controller certificates to a plurality of controllers of a building management system.

FIG. 2 is a flow diagram showing an illustrative method 24 of providing a plurality of controller certificates for a plurality of controllers 14 within the BMS 12 using an application executing on the mobile device 22. The mobile device 22 is in communication with an API of the remote server 20. The mobile device 22 downloads from the remote server 20 project information that defines at least part of the BMS 12. This may include project information originally entered using the engineering tool 18, for example. The downloaded project information may include a project name and controller configuration information for each of the plurality of controllers 14 including a controller name and/or a controller IP address, as generally indicated at block 26. In some cases, the project information may also include one or more points and/or one or more IO terminal assignments for each of the plurality of controllers 14.

In some instances, the mobile device 22 may use the downloaded project information to generate a site name and a common domain name for each of the plurality of controllers 14 of the BMS 12, and may use the site name and the common domain name in soliciting the Certificate Signing Request (CSR) from each of the plurality of controllers of the BMS 12. In any event, the mobile device 22 may use the downloaded project information to solicit a Certificate Signing Request (CSR) from each of the plurality of controllers 14 of the BMS 12 by contacting an API of each of the plurality of controllers 14, as generally indicated at block 28. In response, each of the controllers 14 may provide the requested CSRs, and thus the mobile device 22 may receive the CSRs from each of the plurality of controllers 14, as indicated at block 30. The mobile device 22 may then upload each of the CSRs to the API of the remote server 20 so that the remote server 20 can generate a corresponding controller certificate for each of the plurality of controllers 14 of the BMS 12, as indicated at block 32. As indicated at block 34, each of the generated controller certificates are downloaded to the corresponding plurality of controllers 14 of the BMS 12 and used for subsequent secure communication in the BMS 12.

In some cases, as indicated for example at block 36, the remote server 20 may transmit all of the generated controller certificates to the mobile device 22, and the mobile device 22 may distribute the generated controller certificates to the appropriate controllers. In some cases, the remote server 20 may transmit the generated controller certificates directly to the appropriate controllers.

In some cases, as optionally indicated at block 38, the method 24 may further include tracking the expiration date of each of the generated controller certificates and allowing automatic renewal of the generated controller certificates before expiration of the generated controller certificates. In one example, a user may receive emails or other messages, for example, indicating that one or more of the certificates are due for renewal. In some cases, the mobile device 22 may receive a renewed controller certificates for each of the expiring certificates from the remote server 20, and the mobile device 22 may then download each of the renewed certificates to the corresponding one of the plurality of controllers of the BMS, optionally in response to a single click on a user interface of the mobile device.

Figure 3:
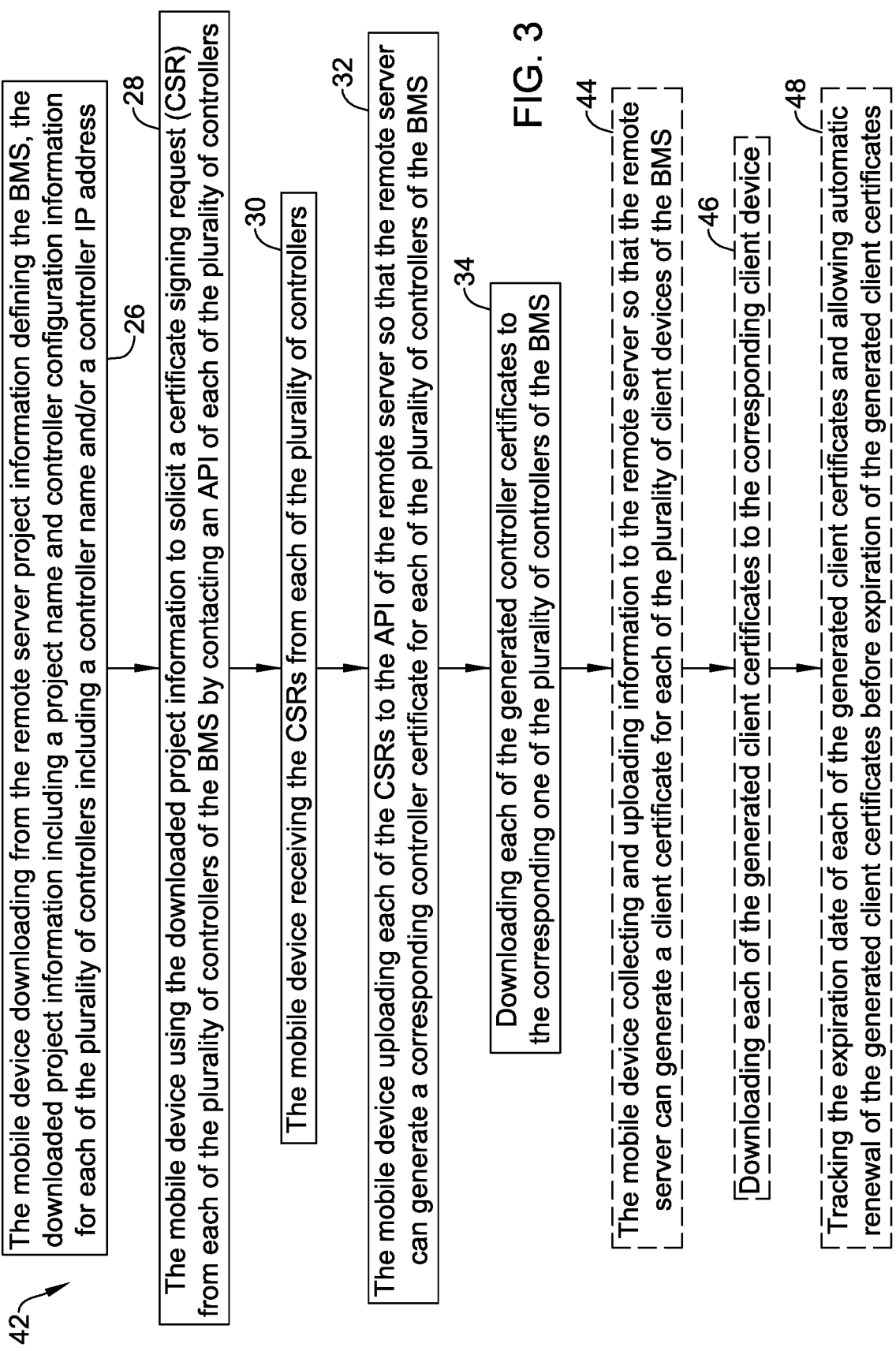
FIG. 3 is a flow diagram showing an illustrative method of providing controller certificates to a plurality of controllers of a building management system.

FIG. 3 is a flow diagram showing an illustrative method 42 of providing a plurality of controller certificates for a plurality of controllers 14 within the BMS 12 using an application executing on the mobile device 22, the mobile device 22 in communication with an API of the remote server 20. In the example shown, the mobile device 22 downloads from the remote server 20 project information that defines at least part of the BMS 12. The downloaded project information may include a project name and controller configuration information for each of the plurality of controllers 14 including a controller name and/or a controller IP address, as generally indicated at block 26. In some cases, the project information may also include one or more points and/or one or more IO terminal assignments for each of the plurality of controllers 14. In some instances, the mobile device 22 may use the downloaded project information to generate a site name and a common domain name for each of the plurality of controllers 14 of the BMS 12. The mobile device 22 may use the site name and the common domain name in soliciting a Certificate Signing Request (CSR) from each of the plurality of controllers 14 of the BMS 12 by contacting an API of each of the plurality of controllers 14, as generally indicated at block 28. In response, each of the controllers 14 will provide the requested CSRs, and thus the mobile device 22 may receive the CSRs from each of the plurality of controllers 14, as indicated at block 30. The mobile device 22 may then upload each of the CSRs to the API of the remote server 20 so that the remote server 20 can generate a corresponding controller certificate for each of the plurality of controllers 14 of the BMS 12, as indicated at block 32. As indicated at block 34, each of the generated controller certificates may be downloaded to the corresponding plurality of controllers 14 of the BMS 12, either directly or indirectly such as via the mobile device 22, and used for subsequent secure communication in the BMS 12.

In some cases, and as optionally indicated at block 44, the mobile device 22 may collect and upload information to the remote server 20 so that the remote server 20 can generate a client certificate for each of a plurality clients 16. The generated client certificates may then be downloaded to the corresponding client 16, as indicated at block 46, and used for subsequent secure communication in the BMS 12.

In some cases, downloading the generated client certificates to each of the plurality of client devices (e.g. the controllers 14 and clients 16) may be initiated by a single click on a user interface of the mobile device 22. In some cases, as optionally indicated at block 48, the expiration date of each of the generated certificates may be tracked in order to allow automatic renewal of the generated certificates before expiration of the generated certificates.

Figure 4:
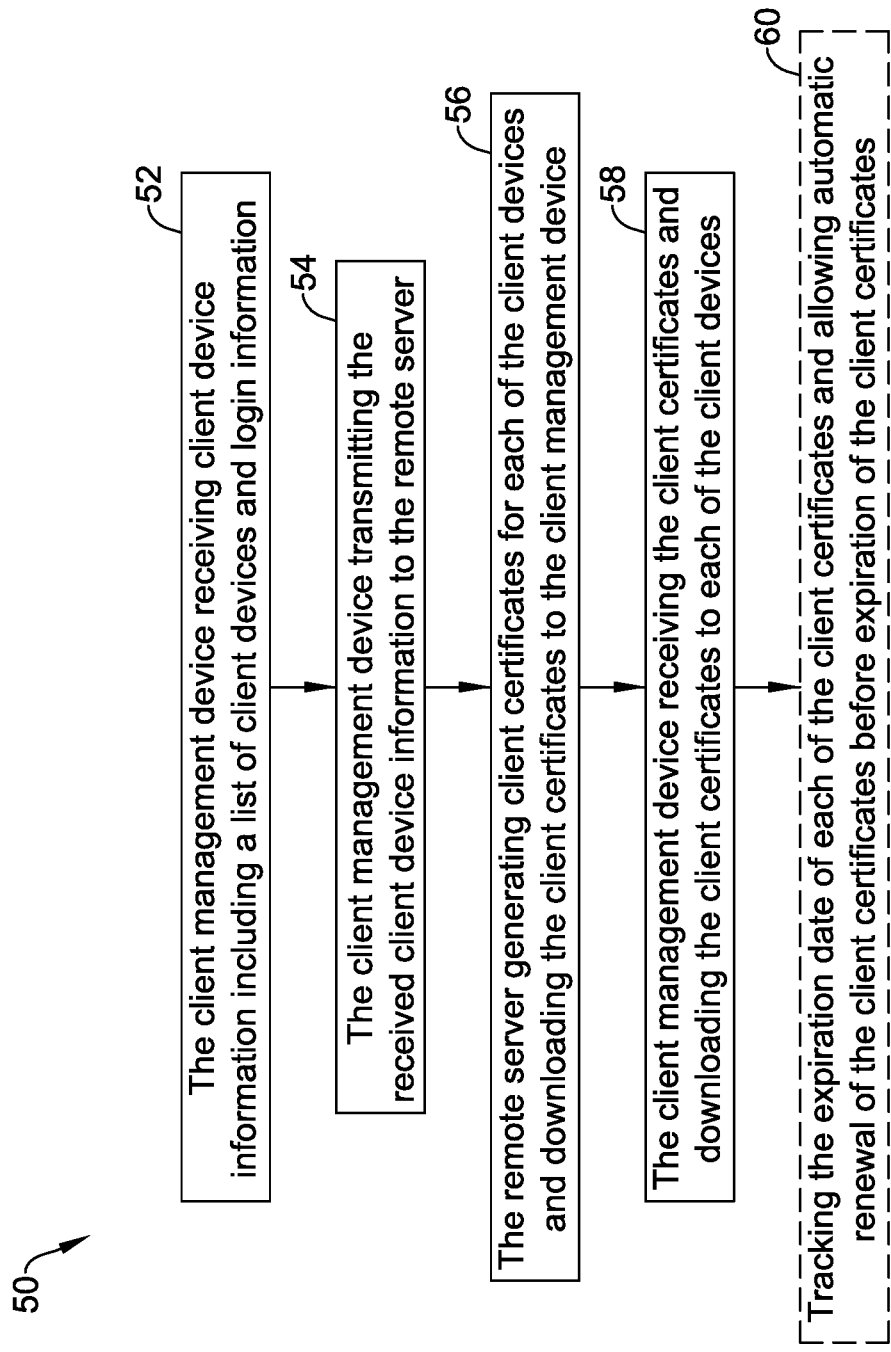
FIG. 4 is a flow diagram showing an illustrative method of providing client certificates to a plurality of client devices of a building management system.

FIG. 4 is a flow diagram showing an illustrative method 50 of generating a plurality of certificates for a plurality of client devices (such as the controllers 14 and/or clients 16 shown in FIG. 1) within a Building Management System (BMS) such as the BMS 12 using an application executing on a certificate management device. The certificate management device may include a user interface, and may be in communication with a remote server. The client management device, which in some cases may be a mobile device such as the mobile device 22, receives client device information including a listing of client devices and login information, as indicated at block 52. The client management device may transmit the received client device information to the remote server 20, as indicated at block 54. The remote server 20 may generate certificates for each of the client devices and download the certificates to the client management device, as indicated at block 56. The client management device may receive the certificates and download each of certificates to the appropriate client device, as indicated at block 58, which are then used for subsequent secure communication in the BMS. In some cases, as optionally indicated at block 60, the method 60 may further include tracking the expiration date of each of the certificates and allow automatic renewal of the certificates before expiration of the certificates.

In some cases, the certificate management device receives each of the generated client certificates from the remote server 20 and then batch downloads each of the client certificates to the corresponding one of the plurality of client devices of the BMS 12. In some instances, downloading each of the generated client certificates from the client management device to the corresponding client devices is initiated by a single click on a user interface of the client management device.

Figure 5:
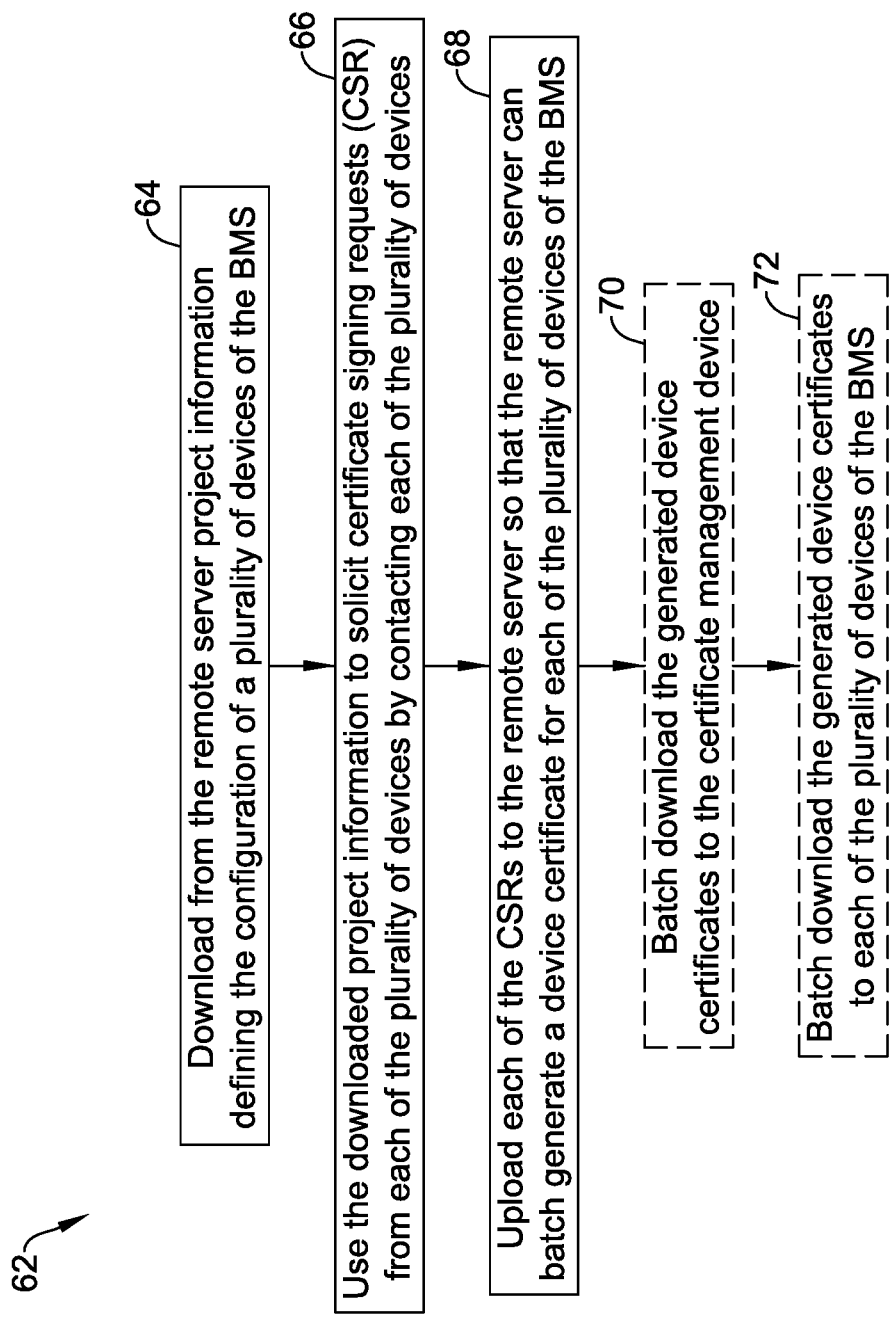
FIG. 5 is a flow diagram showing an illustrative method of providing device certificates to a plurality of devices of a building management system.

FIG. 5 is a flow diagram showing an illustrative method 62 that may be carried out when executable instructions stored on a non-transient, computer-readable storage medium are executed by one or more processors of a certificate management device. Executing the instructions may cause the certificate management device to download from the remote server 20 project information defining the configuration of a plurality of devices of the BMS 12, as indicated at block 64. In some cases, at least some of the devices are controllers. The certificate management device uses the downloaded project information to solicit Certificate Signing Requests (CSR) from each of the plurality of devices by contacting each of the plurality of devices, as indicated at block 66. Once received, each of the CSRs are uploaded to the remote server 20 so that the remote server 20 can batch generate a device certificate for each of the plurality of devices of the BMS, as indicated at block 68. Optionally, the generated device certificates may be batch downloaded to the certificate management device, as indicated at block 70. The generated device certificates may be batch downloaded to each of the plurality of devices of the BMS, as indicated at block 72, and used for subsequent secure communication in the BMS.

Figure 6:
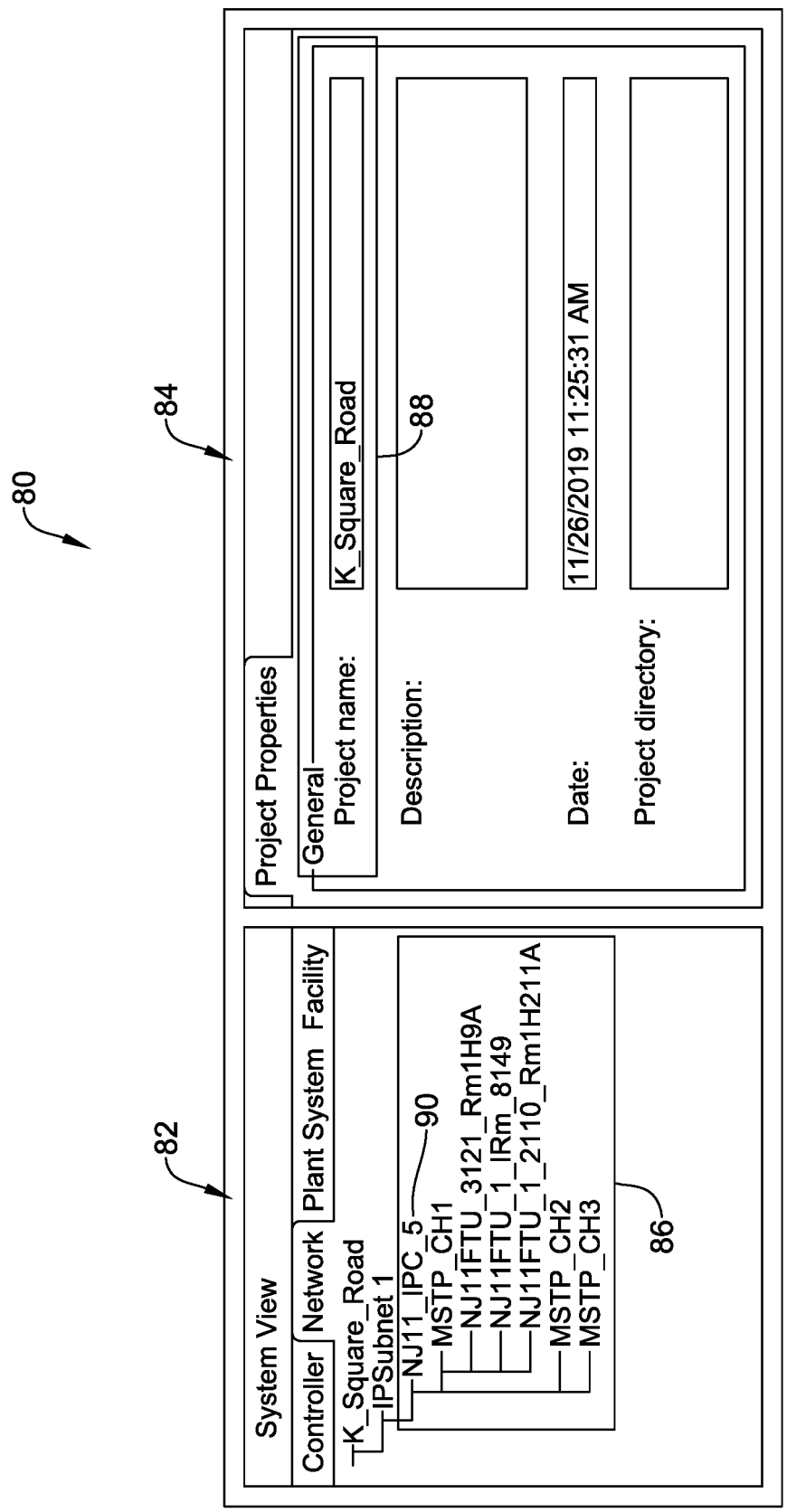
FIG. 6 is an illustrative screen capture provided by an engineering tool being used to initially configure a building management system.

As discussed, the engineering tool 18 may be used to initially configure the BMS 12, including for example providing a project name that can be used as a Site Name for generating certificates. FIG. 6 is a screen shot showing an illustrative screen 80 that may be displayed by the engineering tool 18. The illustrative screen 80 includes a System View window 82 and a Properties Window 84. As illustrated, the System View window 82 is displaying a network hierarchy, as generally indicated by a box 86. As will be discussed, this same network hierarchy may be displayed via an application running on a mobile device such as the mobile device 22. The Properties Window 84 includes a project name, as generally indicated by a box 88. In this particular case, the project name can be seen to be "K_Square Road". The box 86 also includes date information as well as a project directory address.

Figure 7:
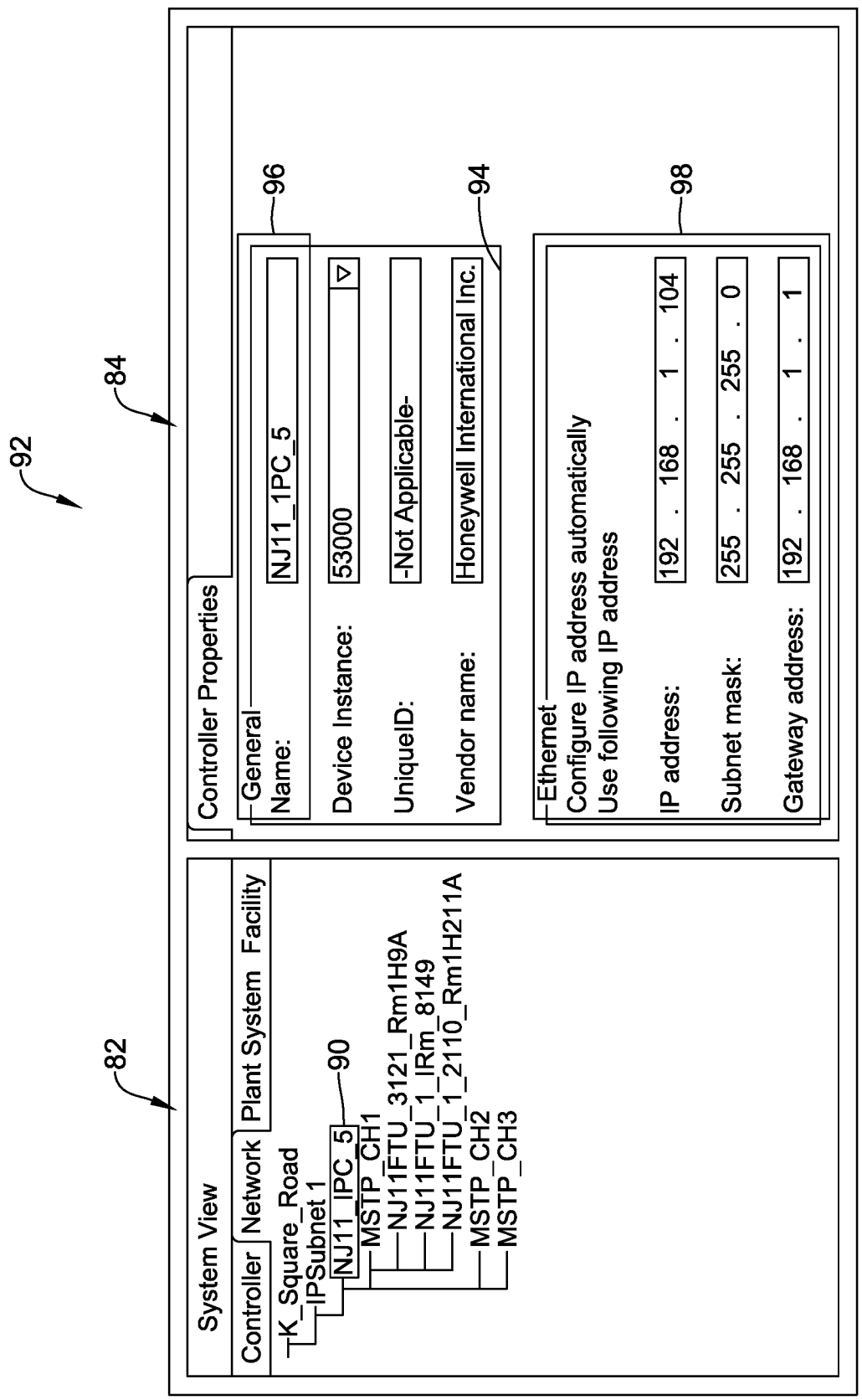
FIG. 7 is an illustrative screen capture provided by an engineering tool being used to initially configured a building management system.

The System View window 82 shows, within the box 86, a number of controller names. Attention is called to the first named controller "NJ11_IPC_5", labeled as 90. FIG. 7 is a screen shot showing an illustrative screen 92. The System View window 82 is generally the same as was shown in FIG. 6. The Properties Window 84 includes a box 94 that provides identifying information for the controller "NJ11_IPC_5" that is labeled as 90, including Device Instance, Unique ID and Vendor Name. The name of the controller, shown in a box 96, can be used as a common name or domain name for subsequently generating certificates. The Properties Window 84 also includes a box 98 that includes address information, such as an IP address, a Subnet Mask and a Gateway Address. In some cases, the IP address may also be used as common name or domain name for subsequently generating certificates.

Figure 8A:
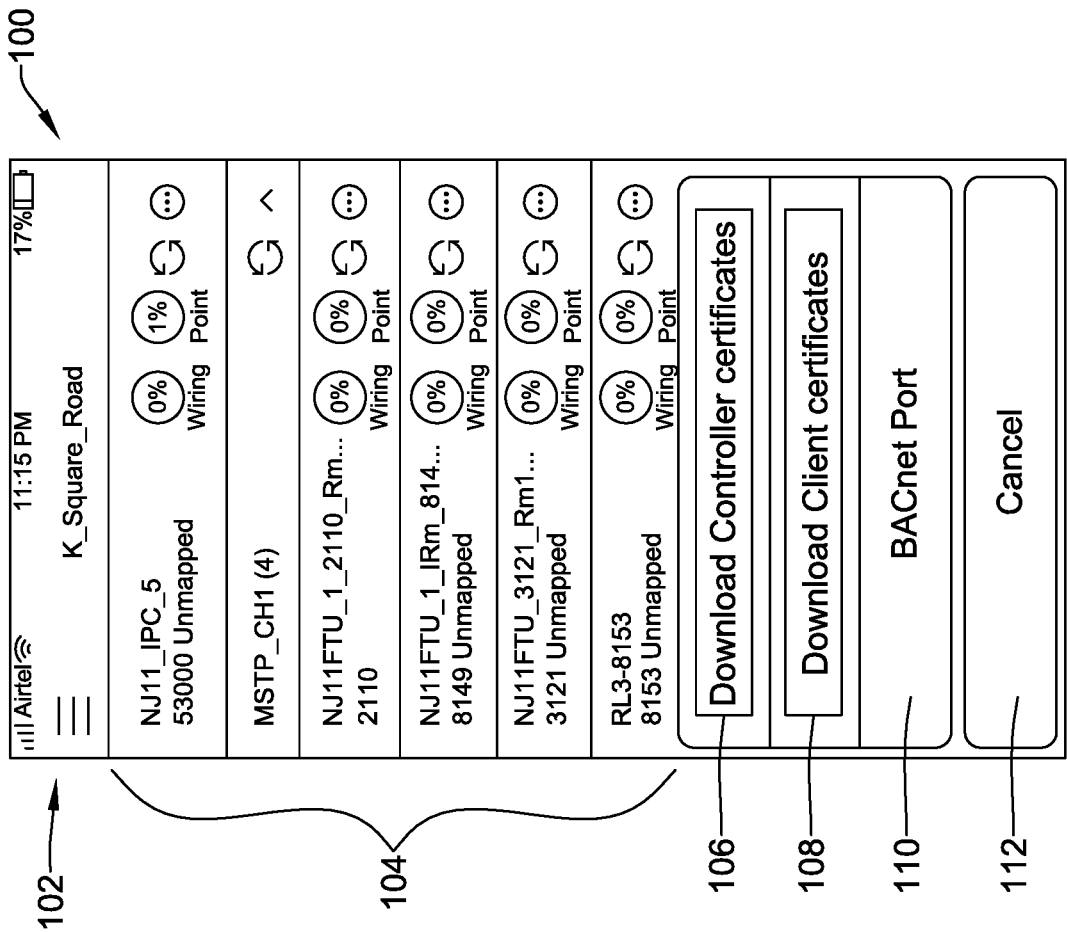
FIGS. 8A and 8B are illustrative screen captures provided by a mobile device being used to obtain certificates for a building management system from a remote server.
Figure 8B:
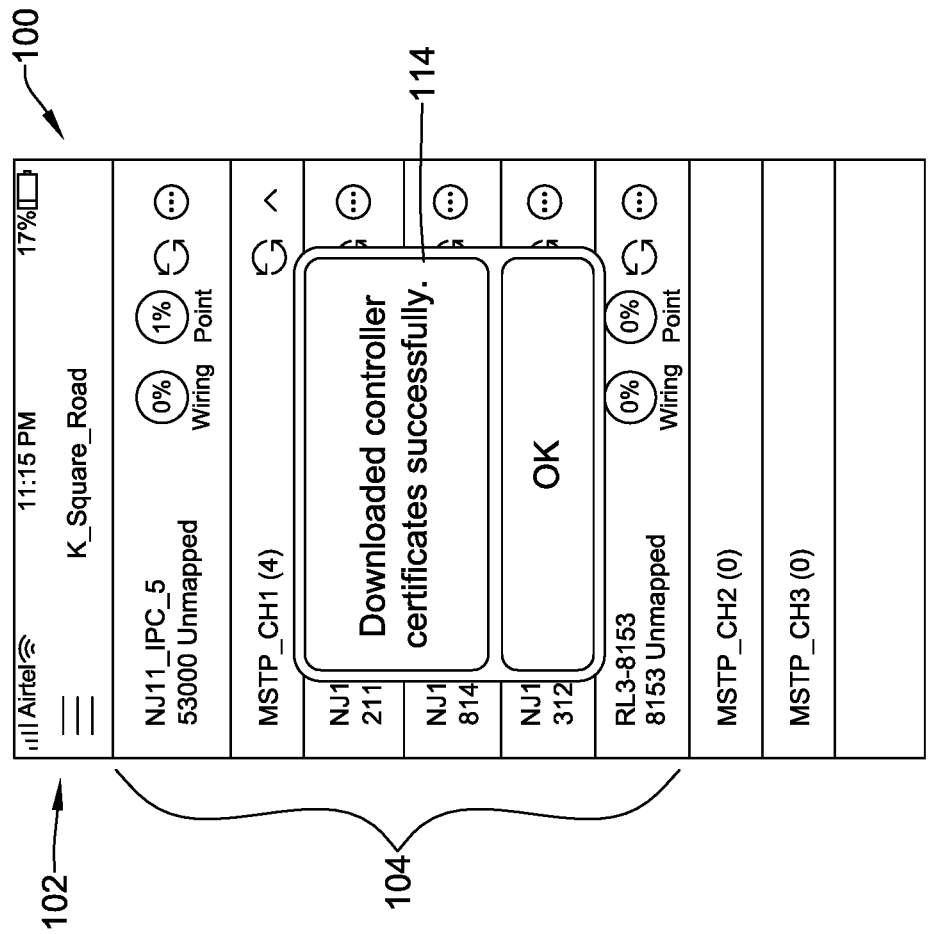

FIG. 8A is a screen shot showing an illustrative screen 100 that may be displayed by the mobile device 22. The illustrative screen 100 includes a Title bar 102 that includes the same project name as shown in FIG. 6. The screen 100 also includes a list 104 of controllers. It will be appreciated that this list 104 of controllers is the same as that included in the System View window 82 of FIGS. 6 and 7, and has been obtained from the engineering tool database. The screen 100 can be seen as including a Download Controller Certificates button 106, a Download Client Certificates button 108, a BACnet port button 110 and a Cancel button 112. It will be appreciated that the Download Controller Certificates button 106 may be used to initiate a download of the controller certificates from the remote server 20 so that the mobile device 22 can subsequently download the controller certificates to each of the controllers 14 of the BMS 12. Similarly, the Download Client Certificates button 108 may be used to initiate a download of the client certificates from the remote server 20 so that the mobile device 22 can subsequently download the client certificates to each of the clients 16 of BMS 12. The BACnet port button 110 may be used to set the BACnet port number for each controller, while the Cancel button 112 may be used to revert to a previous screen, for example. FIG. 8B is similar, but includes a text box 114 that floats over the other displayed information to inform the user that the certificates were successfully downloaded.

Figure 9:
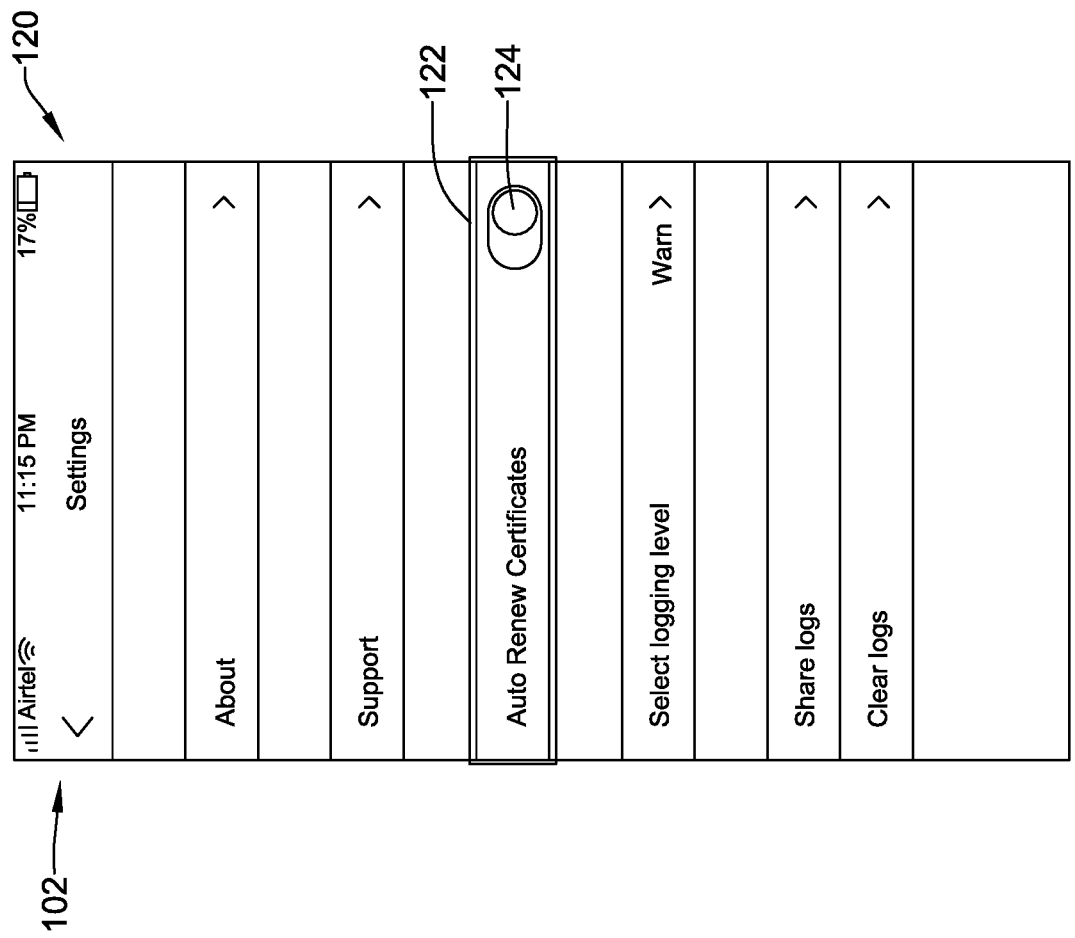
FIG. 9 is an illustrative screen capture provided by a mobile device illustrating a settings screen.

FIG. 9 is a screen shot showing an illustrative screen 120 that may be displayed by the mobile device 22. The screen 120 includes the Title bar 102 indicating that settings are being displayed. While a variety of options are shown, it should be noted that one of the available settings is Auto Renew Certificates 122. This setting includes a radio button 124 that may be turned on or off to turn auto renewal on or off. If auto renewal is turned on, as shown in the screen 120, deadlines for generating new certificates will be tracked, and the new certificates will be automatically requested in order to avoid unnecessary delays or other potential issues otherwise caused by allowing one or more controller or client certificates to become expired.

While the disclosure is described primarily in conjunction with a building management system, this is just one example and it should be understood that the disclosure may be applied to other systems such as industrial process control systems and/or any other suitable system that uses security certificates.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method of providing a plurality of controller certificates for a plurality of controllers within a Building Management System (BMS) using an application executing on a mobile device, the mobile device in communication with a remote server having an Application Programming Interface (API), the method comprising:

the mobile device downloading from the remote server project information defining the BMS, the downloaded project information including a project name and controller configuration information for each of the plurality of controllers including a controller name and/or a controller IP address;

the mobile device using the downloaded project information to solicit a Certificate Signing Request (CSR) from each of the plurality of controllers of the BMS by contacting an API of each of the plurality of controllers;

the mobile device receiving the CSRs from each of the plurality of controllers;

the mobile device uploading each of the CSRs to the API of the remote server so that the remote server can generate a corresponding controller certificate for each of the plurality of controllers of the BMS; and downloading each of the generated controller certificates to the corresponding one of the plurality of controllers of the BMS.

2. The method of claim 1, further comprising the remote server transmitting each of the controller certificates to the mobile device.

3. The method of claim 2, wherein the mobile device receives each of the generated controller certificates from the remote server and then downloads each of the generated controller certificates to the corresponding one of the plurality of controllers of the BMS.

4. The method of claim 3, wherein downloading each of the generated controller certificates from the mobile device to the corresponding one of the plurality of controllers of the BMS is initiated by a single click on a user interface of the mobile device.

5. The method of claim 1, further comprising:
the mobile device collects and uploads information to the remote server so that the remote server can generate a client certificate for each of a plurality of client devices of the BMS, and downloads each of the generated client certificates to the corresponding client device.

6. The method of claim 5, wherein downloading the generated client certificates to each of the plurality of client devices is initiated by a single click on a user interface of the mobile device.

7. The method of claim 5, further comprising tracking the expiration date of each of the generated client certificates and allowing automatic renewal of the generated client certificates before expiration of the generated client certificates.

8. The method of claim 1, further comprising tracking the expiration date of each of the generated controller certificates and allowing automatic renewal of the generated controller certificates before expiration of the generated controller certificates.

9. The method of claim 1, further comprising:
using an engineering tool to configure the BMS, the engineering tool generating and uploading to the remote server the project information including the project name and the controller configuration information for each of the plurality of controllers including a controller name and/or a controller IP address.

10. The method of claim 1, wherein the project information further includes for each of the plurality of controllers, one or more points and/or one or more IO terminal assignments.

11. The method of claim 1, wherein the mobile device uses the downloaded project information to generate a site name and a common domain name for each of the plurality of controllers of the BMS for use in soliciting the Certificate Signing Request (CSR) from each of the plurality of controllers of the BMS.

12. A non-transient, computer-readable storage medium having stored thereon executable instructions that when executed by one or more processors of a certificate management device that is configured to communicate with a remote server cause the certificate management device to:

download from the remote server project information defining the configuration of a plurality of devices of the BMS;

use the downloaded project information to solicit Certificate Signing Requests (CSR) from each of the plurality of devices by contacting each of the plurality of devices; and upload each of the CSRs to the remote server so that the remote server can batch generate a device certificate for each of the plurality of devices of the BMS.

13. The non-transient, computer-readable medium of claim 12, further comprising:
batch download the generated device certificates to the certificate management device; and
batch download the generated device certificates to each of the plurality of devices of the BMS.

14. The non-transient, computer-readable medium of claim 12, wherein at least some of the plurality of devices include controllers.

* * * * *